(12) United States Patent
Li et al.

(10) Patent No.: US 11,499,065 B2
(45) Date of Patent: Nov. 15, 2022

(54) AQUEOUS INKJET INKS CONTAINING A WATER-INSOLUBLE ADDITIVE

(71) Applicant: DUPONT ELECTRONICS, INC., Wilmington, DE (US)

(72) Inventors: Xiaoqing Li, Newark, DE (US); Michael Stephen Wolfe, Wilmington, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 903 days.

(21) Appl. No.: 16/310,936

(22) PCT Filed: Jun. 23, 2017

(86) PCT No.: PCT/US2017/038986
§ 371 (c)(1),
(2) Date: Dec. 18, 2018

(87) PCT Pub. No.: WO2017/223441
PCT Pub. Date: Dec. 28, 2017

(65) Prior Publication Data
US 2020/0308434 A1    Oct. 1, 2020

Related U.S. Application Data

(60) Provisional application No. 62/354,291, filed on Jun. 24, 2016.

(51) Int. Cl.
| | | |
|---|---|---|
| C09D 11/38 | (2014.01) | |
| C08K 3/22 | (2006.01) | |
| C08K 5/00 | (2006.01) | |
| C08L 33/08 | (2006.01) | |
| C09D 11/102 | (2014.01) | |
| C08K 5/07 | (2006.01) | |
| C08L 75/04 | (2006.01) | |
| C09D 11/107 | (2014.01) | |
| C09D 11/322 | (2014.01) | |
| D06P 5/30 | (2006.01) | |

(52) U.S. Cl.
CPC .............. *C09D 11/38* (2013.01); *C08K 3/22* (2013.01); *C08K 5/0041* (2013.01); *C08K 5/07* (2013.01); *C08L 33/08* (2013.01); *C08L 75/04* (2013.01); *C09D 11/102* (2013.01); *C09D 11/107* (2013.01); *C09D 11/322* (2013.01); *D06P 5/30* (2013.01); *C08K 2003/2241* (2013.01)

(58) Field of Classification Search
CPC ..... C09D 11/38; C09D 11/102; C09D 11/107; C09D 11/322; C08K 3/22; C08K 5/0041; C08K 5/07; C08L 33/08; C08L 75/04; D06P 5/30; D06P 1/44; D06P 1/525; D06P 1/5285; D06P 1/645; D06P 1/647; D06P 1/65125; D06P 1/65193; D06P 7/653; D06P 1/65131
See application file for complete search history.

(56) References Cited

U.S. PATENT DOCUMENTS

| | | | |
|---|---|---|---|
| 4,597,794 A | 7/1986 | Ohta et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,231,131 A | 7/1993 | Chu et al. | |
| 5,272,201 A | 12/1993 | Ma et al. | |
| 5,679,138 A | 10/1997 | Bishop et al. | |
| 5,891,231 A | 4/1999 | Gnerlich et al. | |
| 5,976,232 A | 11/1999 | Gore | |
| 6,117,921 A | 9/2000 | Ma et al. | |
| 6,262,152 B1 | 7/2001 | Fryd et al. | |
| 6,306,994 B1 | 10/2001 | Donald et al. | |
| 6,433,117 B1 | 8/2002 | Ma et al. | |
| 8,084,516 B2 | 12/2011 | Takemura et al. | |
| 8,187,372 B2 | 5/2012 | Watarai | |
| 9,255,207 B2 | 2/2016 | Berge et al. | |
| 2003/0089277 A1 | 5/2003 | Zakheim et al. | |
| 2003/0144375 A1* | 7/2003 | Wu ........................ | C09D 11/40 523/160 |
| 2003/0160851 A1 | 8/2003 | Baccay et al. | |
| 2005/0090599 A1 | 4/2005 | Spinelli | |
| 2007/0056118 A1 | 3/2007 | Ellis | |
| 2007/0060670 A1 | 3/2007 | Ellis | |
| 2017/0137652 A1* | 5/2017 | Iuchi ..................... | C09D 11/30 |

FOREIGN PATENT DOCUMENTS

| | | | | |
|---|---|---|---|---|
| EP | 0556649 A1 | 8/1993 | | |
| EP | 1706465 A1 | 10/2006 | | |
| EP | 2794782 A1 | 10/2014 | | |
| EP | 3153555 A1 | 4/2017 | | |
| WO | 2016/010129 A1 | 1/2016 | | |
| WO | WO-2016025319 | * | 2/2016 | ............ C08G 18/60 |

OTHER PUBLICATIONS

Spinelli, H., "Polymeric Dispersants in Ink Jet Technology", Adv. Mater., vol. 10, No. 15, 1998, pp. 1215-1218.
PCT International Search Report for Application No. PCT/US17/038986; Jung, Andreas, Authorized Officer; ISA/EPO; dated Sep. 22, 2017.

* cited by examiner

*Primary Examiner* — Jessica M Roswell
(74) *Attorney, Agent, or Firm* — Simon L. Xu

(57) ABSTRACT

The present disclosure pertains to an aqueous inkjet ink containing a pigment as colorant, a polymeric dispersant, a polymeric binder, and a water-insoluble additive. The inks show improved properties for printing on paper and textile.

19 Claims, No Drawings

AQUEOUS INKJET INKS CONTAINING A WATER-INSOLUBLE ADDITIVE

This application claims priority under 35 U.S.C. § 119 from U.S. Provisional Application Ser. No. 62/354,291, filed Jun. 24, 2016.

BACKGROUND OF THE DISCLOSURE

The present disclosure pertains to an aqueous ink containing a pigment, a dispersant to disperse the pigment, a polymeric binder, and a water-insoluble additive. The present disclosure further pertains to printing of said ink on textile and paper substrates.

Digital printing methods such as inkjet printing are becoming increasingly important for markets other than conventional desktop printing for small office/home office. Digital printing methods have gained popularity in printing of textiles, and offer a number of potential benefits over conventional printing methods such as screen printing. Digital printing eliminates the set up expense associated with screen preparation and can potentially enable cost effective short run production. Digital printing furthermore allows visual effects such as tonal gradients and infinite pattern repeat sizes that cannot be practically achieved with a screen printing process.

A disadvantage of inkjet printing, in particular inkjet printing of textile with pigmented ink, is that inkjet-printed fabrics are particularly susceptible to color removal by abrasion and thus have poor durability. Furthermore, another disadvantage of inkjet printing is that inkjet-printed fabrics do not tolerate washing conditions required for textiles. The printed colors often fade upon washing, and during washing the colors can be undesirably transferred to other fabrics in the wash or to the washing machine parts.

U.S. Pat. No. 8,187,372 discloses inkjet oil/water emulsion inks that contain at least one water-insoluble organic material having a hydroxyl group to bind with cellulose to reduce paper curling.

U.S. Pat. No. 8,084,516 discloses water-based inks containing a water-insoluble organic compound incorporated in a crosslinked polymer pigment dispersion to improve gloss of the printed image and storage stability of the ink.

Various methods have been developed including post-printing heat and pressure treatments to achieve good washfastness. However, they often require prolonged and simultaneous heat/pressure treatments. A need exists for improved film formation upon inkjet printing of an ink, as well as improved durability of inkjet-printed images on textile. The present disclosure satisfies this need by providing ink compositions containing a pigment, a polymeric dispersant, a polymeric binder and a water-insoluble additive.

SUMMARY OF THE DISCLOSURE

An embodiment provides an aqueous inkjet ink comprising an aqueous vehicle, a pigment, a polymeric dispersant, a polymeric binder and a water insoluble additive, wherein said polymeric dispersant and said polymeric binder are different polymers, and said additive is dispersed by said polymeric dispersant and said polymeric binder, has a solubility in water of less than 5 grams in 100 grams of water, and contains one or more molecules having a structure of Formula I:

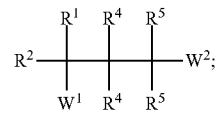

wherein $W^1$ is $OR^3$ or COOH; $W^2$ is $OR^3$, COOH, $SO_3H$ or $NH_2$; $R^1$ is H or $C_1$-$C_{20}$ linear alkyl, $R^2$ is $C_1$-$C_{20}$ linear alkyl, $C_3$-$C_{20}$ branched alkyl, $C_6$-$C_{40}$ aryl or $C_6$-$C_{40}$ substituted aryl, each $R^3$ is independently H, $C_3$-$C_{20}$ branched alkyl or $C_3$-$C_{20}$ substituted branched alkyl; each $R^4$ is independently H, $C_1$-$C_{20}$ linear alkyl or $C_3$-$C_{20}$ branched alkyl; and each $R^5$ is independently H or $C_1$-$C_{20}$ linear alkyl.

Another embodiment provides that the additive is present at an amount less than 8% by weight based on the total weight of the ink.

Another embodiment provides that the ink is printed on a textile substrate.

Another embodiment provides that the pigment is a white pigment for an ink to be printed on a textile substrate.

Another embodiment provides that the textile substrate contains a polyvalent cation.

Another embodiment provides that the is printed on a paper substrate.

Another embodiment provides that the pigment is a cyan pigment for an ink to be printed on a paper substrate.

Another embodiment provides that the dispersant is a polyurethane.

Another embodiment provides that the dispersant is an acrylic polymer.

Another embodiment provides that $R^1$ is H.
Another embodiment provides that $R^2$ is $C_1$-$C_{20}$ alkyl.
Another embodiment provides that $W^1$ and $W^2$ are $OR^3$.
Another embodiment provides that each $R^3$ is H.
Another embodiment provides that each $R^3$ is $C_3$-$C_{20}$ substituted branched alkyl.
Another embodiment provides that each $R^3$ is —C(O)CH$(CH_3)_2$.
Another embodiment provides that $R^2$ is $C_3$-$C_{20}$ branched alkyl.
Yet another embodiment provides that $R^2$ is —CH$(CH_3)_2$.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any sub-combination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "dispersant" means a surface active agent added to a suspending medium to promote uniform and maximum separation of extremely fine solid particles often of colloidal size. For pigments, the dispersants are most often polymeric dispersants and the dispersants and pigments are combined using dispersing equipment.

As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same mole ratio of the monomers in the initial monomer composition.

As used herein, the term "dispersible particles" are those particles that can be dispersed with dispersants including polymeric dispersants.

As used herein, the term "stable dispersion" means a particle dispersion where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "P/D" means the pigment to dispersant weight ratio in the initial dispersion formulation.

As used herein, the term "ambient conditions" refers to surrounding conditions, which are often around one atmosphere of pressure, about 50% relative humidity, and about 25° C.

As used herein, the term "crosslinking" means the chemical reaction between reactive groups on at least two different chemicals, where one of the chemicals is at least trisubstituted.

As used herein, the term "emulsion" means a stable mixture of two or more immiscible liquids held in suspension by small percentages of substances called emulsifiers.

As used herein, the term "nonionic" means an oligomer or polymer derived from ethylene oxide and/or propylene oxide where there are at least 4 of the ethylene oxide or propylene oxide groups, As used herein, the term "binder" means a film forming ingredient in the inkjet ink. This binder is normally added when the ink is formulated.

As used herein, the term "HSD" means High Speed Dispersing.

As used herein, the term "OD" means optical density.

As used herein, the term "Gloss" means observation of reflected light from a printed surface, normally the printed substrate is glossy paper.

As used herein, "smear resistance" refers to the resistance of an image to blurring when stroked with a highlighter marker As used herein, the term "SDP" means a self-dispersible, self-dispersing, or self-dispersed pigments.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight usually reported in daltons.

As used herein, the term "Mw" means weight average molecular weight usually reported in daltons.

As used herein, the term "D50" means the particle size at which 50% of the particles are smaller; "D95" means the particle size at which 95% of the particles are smaller.

As used herein, the term "cP" means centipoise, a viscosity unit.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethane dispersions described herein.

As used herein, the term "branched alkyl" means an alkyl substituted by one or more alkyl groups.

As used herein, the term "substituted alkyl" means an alkyl substituted by one or more OH, Cl, Br or ether groups.

As used herein, the term "substituted aryl" means an aryl substituted by one or more alkyl, OH, Cl, Br or ether groups.

As used herein, the term "Byk®348" refers to a nonionic surfactant obtained from Air Products (Allentown, Pa.).

As used herein, the term "SMA® EF-40" refers to styrene maleic anhydride copolymer obtained from Cray Valley (Exton, Pa.)

As used herein, the term "Texanol Ester Alcohol" refers to 2,2,4-Trimethyl-1,3-pentanediol monoisobutyrate isomer mixture obtained from Aldrich (Milwaukee, Wis.).

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Water-Insoluble Additive

A pigmented inkjet ink is typically formulated with a pigment dispersion stabilined with a water-soluble or water-dispersible polymeric dispersant. A polymeric binder is added to the ink formulation to improve the durability of the printed image and waterfastness when the ink is printed on textiles. A limitation of the current direct-to-garment (DTG) white ink is that the printed garment must be pressed for several minutes under both heat and pressure to achieve good waterfastness. If only heat is applied without pressure, poor waterfastness is observed, and the printed images form cracks and may be easily peeled off after a few washing and drying cycles. In order to solve this problem, experiments were conducted using different additives to improve film formation of inkjet inks. It was surprisingly found that certain water-insoluble additive can aid the fusing of polymeric binder and pigment particles to form a strong film on textiles after printing with a treatment of only heat without pressure. It was also found that presence of such additive in an ink can improve the gloss of a printed image upon printing on glossy media. It is speculated that these additives can improve the compatibility of a pigment and polymer binder resulting in an ink film with enhanced integrity and leveling, and eventually leading to better durability and glossiness of the printed image. The water-insoluble additive has a solubility in water of less than 5 grams in 100 grams of water, and contains one or more molecules having a structure of Formula I:

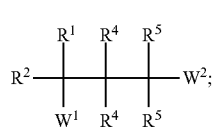

(I)

wherein $W^1$ is $OR^3$ or COOH; $W^2$ is $OR^3$, COOH, $SO_3H$ or $NH_2$; $R^1$ is H or $C_1$-$C_{20}$ linear alkyl, $R^2$ is $C_1$-$C_{20}$ linear alkyl, $C_3$-$C_{20}$ branched alkyl, $C_6$-$C_{40}$ aryl or $C_6$-$C_{40}$ substituted aryl, each $R^3$ is independently H, $C_3$-$C_{20}$ branched alkyl or $C_3$-$C_{20}$ substituted branched alkyl; each $R^4$ is independently H, $C_1$-$C_{20}$ linear alkyl or $C_3$-$C_{20}$ branched alkyl; and each $R^5$ is independently H or $C_1$-$C_{20}$ linear alkyl.

The boiling point of the water-insoluble additive is typically higher than 250° C. The amount of the additive in an ink is typically between 0.1% and 8% by weight based on the total weight of the ink.

Pigments

Pigments suitable for used in the present invention are those generally well-known in the art for aqueous inkjet inks. Traditionally, pigments are stabilized by dispersing agents, such as polymeric dispersants or surfactants, to produce a stable dispersion of the pigment in the vehicle. Representative commercial dry pigments are listed in U.S. Pat. No. 5,085,698. Dispersed dyes are also considered pigments as they are insoluble in the aqueous inks used herein. More recently so-called "self-dispersible" or "self-dispersed" pigments (hereafter "SDP") have been developed. As the name would imply, SDPs are dispersible in water without dispersants.

Pigments which have been stabilized by polymeric dispersants may also have these dispersants crosslinked after the pigments are dispersed. An example of this crosslinking strategy is described in U.S. Pat. No. 6,262,152.

A wide variety of organic and inorganic pigments, alone or in combination, may be selected to make the ink. The term "pigment" as used herein means an insoluble colorant. The pigment particles are sufficiently small to permit free flow of the ink through the inkjet printing device, especially at the ejecting nozzles that and pigment dispersion usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is preferably less than about 500 nm, more preferably less than about 300 nm.

The polymerically dispersed pigments may have the polymeric dispersants crosslinked after the dispersion process is completed. In this case the pigment is thought to have its polymeric dispersants crosslinked to each other by the addition of crosslinked components. A type of this crosslinked is described in U.S. Pat. No. 6,262,152.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much defloculation in the process of preparing the inks as pigments in dry form.

Polymeric Dispersants

Polymeric dispersants are those typically used for dispersing pigments, especially when these pigments are used for inkjet inks. Examples of these dispersants include polyurethanes and acrylic/acrylate copolymers. The polymers may be random or structured. The polymeric dispersant has a number average molecular weight of 2000 to 15000 daltons. Optionally, the molecular weight is 2000 to 9000 daltons.

The structured polymeric dispersant may be water soluble and may have a solubility of at least 10 grams of polymer/100 grams of water at 25° C. The solubility is measured in its neutralized form.

A subset of the random and structured polymer dispersants are ionically stabilized dispersants where the stabilization by the dispersant is ionic with little or no steric stabilization. These ionic polymeric dispersants are described in US Patent Application Publication No. 20050090599.

The polymeric dispersant for the pigment may be either a random or structured polymer. The polymer dispersant can be a copolymer of hydrophobic and hydrophilic monomers. The hydrophobic monomers are acrylates and the hydrophilic monomers are acrylics. Alternately, the polymeric dispersant may be a polyurethane.

Typical random polymeric dispersants have been described in U.S. Pat. No. 4,597,794.

The "structured polymer" can mean polymers having a block, branched, graft or star structure. Examples of structured polymers include AB or BAB block copolymers such as disclosed in U.S. Pat. No. 5,085,698; ABC block copolymers such as disclosed in EP Patent Specification No. 0556649; and graft polymers such as disclosed in U.S. Pat. No. 5,231,131. Other polymeric dispersants that can be used are described, for example, in U.S. Pat. Nos. 6,117,921, 6,262,152, 6,306,994 and 6,433,117.

Polymer dispersants suitable for use in the present invention generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth) acrylate may be employed.

Generally speaking, the hydrophobic region is the part that contains the absorbing segment, which is the segment or function of the dispersant interacting with the pigment surface to effect dispersion. The hydrophilic segment is the segment that provides the stability of dispersion by interaction in the solute mixture to provide stabilization. This stabilization is characterized as steric stabilization or ionic stabilization. These phenomena were described by H Spinelli in Adv. Mater, 1998, 10, no. 15, page 1215 to 1218. The ionically stabilized polymeric dispersants described above have little if any steric stabilization. The polymeric dispersant can be neutralized prior to the start of the dispersion process. That is, the initial mixture of solvent blend and polymer dispersant has an appropriate amount of neutralizing agent. Alternatively, the neutralizing agent may be added with the polar solvent during the dispersing process. An additional option is to have the polymeric dispersant partially neutralized in the initial mixture and add additional neutralizing agent in the polar solvent. The amount of neutralization of the polymeric dispersant in the final mixture is up to about 100% neutralized, and preferably up to about 90% neutralized.

The neutralizing agent can be hydroxides of the alkali metals, amines and the like. Examples of neutralizing agents include organic bases such as mono-, di, tri-methylamine, morpholine, n-methyl morpholine; alcohol amines such as dimethylethanolamine (DMEA), methyldiethanolamine, mono-, di, and tri-ethanolamine; pyridine; ammonium hydroxide; tetra-alkylammonium salts such as tetramethyl-ammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal inkjet printers.

The polyurethane polymeric dispersants are prepared from isocyanates compounds, isocyanate-reactive compounds and a isocyanate or isocyanate reactive compound that has an ionic substituent. This ionic substituent is present in the polyurethane dispersant to stabilize it in an aqueous solution. Often these polyurethane dispersants are prepared as a polyurethane prepolymer with excess isocyanate groups. Then a chain terminating isocyanate-reactive group is added to obtain polyurethane dispersant. The ionic content of the polyurethane can be as low as 10 and as high as 90 milliequivalents/gram when measured as an acid group or an amine group depending on the source of the ionic substituent. The ionic component is at least partially neutralized prior to its use as a dispersant. The molecular weight range of these polyurethanes is from 2000 to 9500 daltons.

Dispersion of the Pigment Particles

Preparation of Titanium dioxide dispersion can be found in Patent Application Publication No. US20070060670, which is incorporated by reference herein as if fully set forth.

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. Nos. 5,022,592, 5,026,427, 5,891,231, 5,679,138, 5,976,232 and US Patent Application Publication No. 20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink-jet inks the target value of the D50 is 125 nm or less, preferably less than 100 nm. Also the D95 and the particles smaller than 204 nm can be used as a test criteria for the pigment dispersions.

A wide variety of organic and inorganic pigments, alone or in combination, may be selected for dispersion by this process. The dispersed pigment may be used in paints, inks and especially inkjet inks. The term "pigment" as used herein means an insoluble colorant and in the present application includes disperse dyes. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The dispersed pigment may be purified after the dispersion process by filtration, ultrafiltration or other processes used for purification of dispersed pigments.

Post-Modification of Polymeric Dispersant After Dispersing the Pigment

The polymeric dispersant may be crosslinked after the pigment dispersion is prepared prior to its inclusion in the inkjet ink.

For crosslinking the polymeric dispersant is substituted with crosslinkable moieties which are selected from the group consisting of acetoacetoxy, acid, amine, epoxy, hydroxyl, blocked isocyanates and mixtures thereof. Then a crosslinking agent is added and the crosslinking of the polymeric dispersant occurs. The crosslinking agent is selected from a group consisting of acetoacetoxy, acid, amine, anhydride, epoxy, hydroxyl, isocyanates, blocked isocyanates and mixtures thereof. The crosslinking of the polymeric dispersant is done after the pigment is dispersed. After the crosslinking step excess polymer can be removed by purification processes such as ultrafiltration.

Specific examples of crosslinking moiety/agent pairs are hydroxyl/isocyanate and acid/epoxy.

Polymeric Binder

A binder is a polymeric compound or a mixture of polymeric compounds that can be optionally added to the ink formulation. The binder can impart properties to the final printed material that, for example, gives greater durability to the printed material. Typical polymers used as binders in inkjet inks include polyurethane dispersions and polyurethane solutions, acrylics, styrene acrylics, styrene butadienes, styrene butadiene acrylonitriles ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups.

The binder can be used singly or in combination with other binders. Typically, the binder is a polyurethane. An optional polyurethane binder is one that has a modest amount of crosslinking which when used in an inkjet ink enhances the durability of the printed image.

The binder is typically present in an ink in an amount of at least 0.2% by weight based on the total weight of the ink. The amount can be from 1 to 15 weight percent.

A binder is usually added together with other ingredients to a pigment dispersion to prepare an ink. Though some polymers can function both as a binder and as a dispersant, many binders are different from dispersants that disperse a pigment to form a pigment dispersion. The binders and dispersants of the instant disclosure are different polymers.

Aqueous Vehicle

The vehicle is a carrier for the colorant. An "aqueous vehicle" refers to a vehicle comprised of water, the 1-alkyl-2-pyrrlidone and an optional additional, water-soluble organic solvent. Selection of a suitable mixture depends on requirements of the specific application, such as desired surface tension and viscosity, the selected colorant, and compatibility with substrate onto which the ink will be printed.

Examples of water-soluble organic solvents include alcohols, ketones, keto-alcohols, ethers and others, such as thiodiglycol, sulfolane, 1,3-dimethyl-2-imidazolidinone, and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylen or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether.

An aqueous vehicle will typically contain 30 wt % to 95 wt % (based on the weight of the aqueous vehicle) water.

Other Ingredients

The inkjet ink may contain other ingredients as are well known in the art. For example, anionic, nonionic, cationic or amphoteric surfactants may be used. In aqueous inks, the surfactants are typically present in the amount of about 0.01 to about 5%, and preferably about 0.2 to about 2%, based on the total weight of the ink.

Co-solvents, such as those exemplified in U.S. Pat. No. 5,272,201 (incorporated by reference herein for all purposes as if fully set forth) may be included to improve pluggage inhibition properties of the ink composition.

Biocides may be used to inhibit growth of microorganisms.

Sequestering agents such as EDTA may also be included to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.4 wt %, and more typically from about 80 wt % to about 99 wt %. The pigments are generally present in amounts up to 15 wt %, more typically from 0.5 wt % to about 12 wt %, and optionally from 3 wt % to 10 wt %. The polymeric binders are generally present in amounts of 1 to 10 wt %. Percentages are weight percent of the total weight of ink.

Ink Properties

Jet velocity, separation length of the droplets, drop size and stream stability are greatly affected by the surface tension and the viscosity of the ink. Inkjet inks suitable for use with inkjet printing systems should have a surface tension in the range of about 20 dyne/cm to about 70 dyne/cm, more preferably about 25 to about 40 dyne/cm at 25° C. Viscosity is preferably in the range of about 1 cP to about 30 cP, more preferably about 2 to about 20 cP at 25° C. The ink has physical properties compatible with a wide range of ejecting conditions, i.e., driving frequency of the pen and the shape and size of the nozzle.

The inks should have excellent storage stability for long periods. Preferably, the instant inks can sustain elevated temperature in a closed container for extended periods (e.g. 70° C. for 7 days) without substantial increase in viscosity or particle size.

Further, the ink should not corrode parts of the inkjet printing device it comes in contact with, and it should be essentially odorless and non-toxic.

Inks of the instant invention can achieve the beneficial durable properties of washfastness.

Ink Set

The term "ink set" refers to all the individual inks or other fluids an inkjet printer is equipped to jet.

The ink sets in accordance with the present invention, when printed on paper substrates, preferably comprise at least three differently colored inks (such as CMY), or at least four differently colored inks (such as CMYK), wherein at least one of the inks is an aqueous inkjet ink as described above. The ink sets in accordance with the present invention, when printed on textiles, preferably comprise at least a white ink and three differently colored inks (such as CMY), or at least a white ink and four differently colored inks (such as CMYK), wherein at least one of the inks is an aqueous inkjet ink as described above.

The other inks of the ink set are preferably also aqueous inks, and may contain dyes, pigments or combinations thereof as the colorant. Such other inks are, in a general sense, well known to those of ordinary skill in the art.

Preferably all of the inks in the inkjet ink set are inkjet inks in accordance with the present invention as described above.

In addition to one or more of the typical CMYK colors, the ink sets in accordance with the present invention may further comprise one or more "gamut-expanding" inks, including different colored inks such as an orange ink, a green ink, a violet ink, a red ink and/or a blue ink, and combinations of full strength and light strengths inks such as light cyan and light magenta.

A particularly preferred use of the inks and ink sets of the present invention is in the inkjet printing of textiles. Textiles include but are not limited to cotton, wool, silk, nylon, polyester and the like, and blends thereof. The finished form of the textile includes, but is not limited to, fabrics, garments, t-shirts, furnishings such as carpets and upholstery fabrics, and the like. Additionally, fibrous textile materials that come into consideration are especially hydroxyl-group-containing fibrous materials, including but not limited to natural fibrous materials such as cotton, linen and hemp, and regenerated fibrous materials such as viscose and lyocell. Further fibrous materials include wool, silk, polyvinyl, polyacrylonitrile, polyamide, aramide, polypropylene and polyurethane. The said fibrous materials are preferably in the form of sheet-form textile woven fabrics, knitted fabrics or webs.

The textile material can be pretreated with, for example, an inorganic salt solution prior to digitally printing. A preferred pretreatment is an aqueous multivalent cationic salt solution disclosed in US Patent Publication No. 2007/0056118 entitled "Fabric Pretreatment for Inkjet Printing", the disclosure of which is incorporated by reference herein for all purposes as if fully set forth.

A preferred pretreatment is a solution of a multivalent cation salt such as calcium chloride, calcium nitrate or calcium nitrate tetrahydrate. A 20 wt % calcium nitrate tetrahydrate solution can be effectively used. The treating conditions can utilize any means such as spraying, dipping, padding to apply the pretreatment solution.

Preferably, the pretreatment solution is applied to the fabric by spraying from about 0.20 to about 7.5 grams of multivalent cationic (calcium) salt per 100 grams of fabric, more preferably from about 0.60 to about 6.0 grams of multivalent cationic (calcium) salt per 100 grams of fabric, and still more preferably from about 0.75 to about 5.0 grams of multivalent cationic (calcium) salt per 100 grams of fabric.

The printed textiles may optionally be post processed with heat and/or pressure, such as disclosed in US20030160851, the disclosure of which is incorporated by reference herein for all purposes as if fully set forth.

Upper temperature is dictated by the tolerance of the particular textile being printed. Lower temperature is determined by the amount of heat needed to achieve the desired level of durability. Generally, fusion temperatures will be at least about 80° C. and preferably at least about 140° C., more preferably at least about 150° C. and most preferably at least about 160° C.

Fusion pressures required to achieve improved durability can be very modest. Thus, pressures can be about 3 psig, preferably at least about 5 psig, more preferable at least about 8 psig and most preferably at least about 10 psig. Fusion pressures of about 30 psi and above seem to provide no additional benefit to durability, but such pressures are not excluded.

The duration of fusion (amount of time the printed textile is under pressure at the desired temperature) is not believed to be particularly critical. Most of the time in the fusion operation generally involves bringing the print up to the desired temperature. Once the print is fully up to temperature, the time under pressure can be brief (seconds).

The white ink can be digitally printed as a background for an image prior to putting the digitally printed image on the textile, and/or as part of the image. When printed as background, the white ink can enhance the coloring of the image. For a colored textile, digitally preprinting a white background can be particularly useful. A preferred white ink is disclosed in US2007/0060670, entitled "Aqueous Inkjet Inks", the disclosure of which is incorporated by reference herein for all purposes as if fully set forth.

When printing on textiles, the white ink can provide other benefits. Often when textiles are printed, the ink will feather into the textile giving an indistinct boundary. The white ink could be used to print a small, imperceptible boundary to a design and making it appear to have a distinct boundary.

Criteria for a successful digitally printed textile include bright representative coloring, adequate hand feel, good durability relative to wash fastness and crock of the printed image. The inventive ink when used by itself or within an ink set helps to provide these advantages.

This invention now will be further illustrated, but not limited, by the following examples.

EXAMPLES

Preparation of White Inks

Inks used in the examples were made according to standard procedures in the inkjet art. Ingredient amounts are in weight percent of the final ink. Polymer binders and colorants are quoted on a solids basis. TiO2 pigment dispersion described in U.S. Patent Application Publication No. 20070060670 was employed to make Ink-1 and Ink-2. The polyurethane PUD EX2 described in U.S. Pat. No. 9,255,207 was employed as polyurethane polymer binder in Ink-1 and Ink-2.

As an example of ink preparation, the ink vehicle was prepared and added with stirring to the aqueous polyurethane binder. After stirring until a homogeneous mixture was obtained, the solution was added to the Titanium dioxide dispersion slurry and mixed until homogeneous again. The water-insoluble additive was added last to the above mixture and stirred for another 3 hours, or until a good ink mixture was obtained. White inks Ink-1 and Ink-2 with the ingredients listed in Table 1 below were thus prepared.

TABLE 1

| Component % (based on solid weight) | Ink-1 (comp.) | Ink-2 |
|---|---|---|
| Titanium Dioxide dispersion | 10.00 | 10.00 |
| Glycerol | 21.00 | 21.00 |
| Ethylene glycol | 15.00 | 15.00 |
| Polyurethane binder | 14.00 | 14.00 |
| Byk ®348 | 1.00 | 1.00 |
| Texanol Ester Alcohol |  | 1.00 |
| Water | Balance to 100% | |

Printing and Testing of Washfastness

Solid white images were printed, using Ink-1 and Ink-2, on Gildan Heavyweight 100% cotton black T-shirt with a M-LINK Direct-to-Garment printer from M&R Companies (Roselle, Ill.). Before printing, the shirts were sprayed with DuPont Artistri P5001 pretreatment solution and then pressed to dry using a George Knight Digital Swing Away DK20S Heat Press for 30 seconds at 165° C. under medium pressure. After printing, the finished shirts were dried with DragonAir™ T-shirt curing system, model DAG3611, from Brown Digital (Wyoming, Mich.). Two duplicate shirts were printed with the same ink and then cured at 300° F. for 7 minutes and 320° F. for 10 minutes, respectively. To measure the washfastness of the printed image, the t-shirts were subject to ten cycles of laundering. Color properties of the solid white images were measured, and compared before and after washing. To accentuate the deteriorating effect of laundering, color properties were measured while the image was stretched to 150% of its original size under force. Colorimetric measurements were done using Minolta Spectrophotometer CM-3600d using Spectra Match software. Optical Density (OD) was recorded. Higher OD indicates less white. Results in Table 2 below showed that images printed with Ink-2 having a water-insoluble additive gave improved washfastness results with small or no change in color properties after ten cycles of washing. OD of the images printed with the comparative Ink-1 increased significantly after washing due to break-up of the white ink film indicating unacceptable washing resistance.

TABLE 2

|  | Ink-1 (comp.) | Ink-2 | Ink-1 (comp) | Ink-2 |
| --- | --- | --- | --- | --- |
| Curing conditions | 300° F. for 7 minutes | 300° F. for 7 minutes | 320° F. for 10 minutes | 320° F. for 10 minutes |
| OD before washing | 0.05 | 0.05 | 0.06 | 0.05 |
| OD after 10 washing cycles | 0.10 | 0.06 | 0.15 | 0.05 |
| % OD change | 100% | 20% | 150% | 0% |

Preparation of Cyan Inks

Cyan inks used in the examples were made according to standard procedures in the inkjet art. Ingredient amounts are in weight percent of the final ink. Polymer binders and colorants are quoted on a solids basis. A cyan pigment dispersion described in U.S. Patent Application Publication No. 20150218397 was employed to make Ink-3, Ink-4, Ink-5 and Ink-6. Before adding to the ink, SMA® EF-40 binder was hydrolyzed and dissolved as a 20% dispersion in potassium hydroxide water mixture.

As an example of ink preparation, the ink vehicle was prepared and added with stirring to the SMA® EF-40 polymer dispersion. After stirring until a homogeneous mixture was obtained, the solution was added to the cyan pigment dispersion and mixed until homogeneous again. The water-insoluble additive was added last to the above mixture and stirred for another 3 hours, or until a good ink mixture was obtained. The ingredients in Ink-3 through Ink 6 are listed in Table 3 below.

TABLE 3

| Component % (based on solid weight | Ink-3 (comp.) | Ink-4 (comp.) | Ink-5 | Ink-6 |
| --- | --- | --- | --- | --- |
| Cyan dispersion | 4.00 | 4.00 | 4.00 | 4.00 |
| Glycerol | 12.00 | 12.00 | 12.00 | 12.00 |
| Triethylene glycol butyl ether | 2.00 | 2.00 | 2.00 | 2.00 |
| Trimethylol propane | 4.00 | 4.00 | 4.00 | 4.00 |
| 1,2-Hexanediol | 3.00 | 3.00 | 3.00 | 3.00 |
| SMA® EF-40 |  | 2.00 | 2.00 | 2.00 |
| Byk ®348 | 1.00 | 1.00 | 1.00 | 1.00 |

TABLE 3-continued

| Component % (based on solid weight | Ink-3 (comp.) | Ink-4 (comp.) | Ink-5 | Ink-6 |
| --- | --- | --- | --- | --- |
| Texanol Ester Alcohol |  |  | 1.00 | 1.60 |
| Water | Balance to 100% | | | |

Printing and Testing Techniques

An inkjet ink set for color printing typically comprises cyan, magenta and yellow colorants. When a pigment is used as the colorant for inks, the specular reflected light from printed images has, in some cases, a color tone different from the inherent color of the pigment called bronzing effect, resulting from the strong wavelength dependence of the pigment refractive index. While bronzing can occur for all color pigmented inks, it is more pronounced for cyan pigments in general, and particularly, when copper phthalocyanine cyan pigment is printed on glossy media. This particular pigment's high refractive index at red wavelengths (600-700 nm) is manifested by specularly reflected light on glossy prints and thus exhibits a reddish tone significantly impairing image quality.

Bronzing may be reduced by incorporating a polymer binder into the ink with high refractive index to raise the average refractive index of the non-pigment ink fraction remaining on the print after ink vehicle penetration/evaporation. However, gloss tends to degrade due to incompatibility between binder and pigment, and stronger light scattering as a result of non-uniform film formation and poor ink leveling. Surprisingly, addition of water-insoluble additive is able to improve image glossiness while maintaining reduced bronzing effect.

Cyan inks were printed on EPSON Premium Photoglossy (EPPG) Paper using an EPSON B310N printer set to "Best Photo" print mode. The test pattern to assess bronzing was a solid cyan block print with 100% coverage. X-rite (Grand Rapids, Mich.) SP64 portable sphere spectrophotometer was used to collect two reflectance curves from 400 nm-700 nm, specular included (SPIN) and specular excluded (SPEX). Bronzing effect was evaluated based on bronzing metric value which was the difference of SPIN-SPEX reflectance at 640 nm normalized by the minimum SPIN-SPEX reflectance. Higher bronzing metric value indicates worse bronzing. The test pattern to assess gloss consisted of 1"×1" color blocks at 100% area fill. The gloss was measured at 20-degree angle. The gloss measurements were made with a Byk-Gardner Micro-TRI gloss instrument. Printing results are summarized in Table 4 below.

TABLE 4

| Ink | Bronzing Metric | Gloss (20-degree) |
| --- | --- | --- |
| Ink-3 (comp) | 5.37 | 60.00 |
| Ink-4 (comp) | 2.92 | 28.97 |
| Ink-5 | 3.02 | 36.37 |
| Ink-6 | 3.02 | 34.43 |

As shown in Table 4, Ink-3, without a polymer binder, had significant bronzing effect. Ink-4, having a polymeric binder, had reduced bronzing at the expense of gloss. Ink-5 and Ink-6, having a polymeric binder and a water-insoluble additive, were able to alleviate gloss reduction while maintaining less bronzing on glossy media.

The invention claimed is:

1. An aqueous inkjet ink comprising an aqueous vehicle, a pigment, a polymeric dispersant, a polymeric binder and a water insoluble additive, wherein said polymeric dispersant and said polymeric binder are different polymers, and said additive is dispersed by said polymeric dispersant and said polymeric binder, has a solubility in water of less than 5 grams in 100 grams of water, and contains one or more molecules having a structure of Formula I:

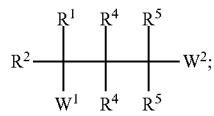

wherein $W^1$ is $OR^3$ or COOH; $W^2$ is COOH, $SO_3H$ or $NH_2$; $R^1$ is $C_1$-$C_{20}$ linear alkyl, $R^2$ is $C_1$-$C_{20}$ linear alkyl, $C_3$-$C_{20}$ branched alkyl, $C_6$-$C_{40}$ aryl or $C_6$-$C_{40}$ substituted aryl, each $R^3$ is independently H, $C_3$-$C_{20}$ branched alkyl, $C_3$-$C_{20}$ substituted branched alkyl or —C(O)CH(CH$_3$)$_2$; each $R^4$ is independently H, $C_1$-$C_{20}$ linear alkyl or $C_3$-$C_{20}$ branched alkyl; and each $R^5$ is independently H or $C_1$-$C_{20}$ linear alkyl.

2. The ink of claim 1, wherein said additive is present at an amount less than 8% by weight based on the total weight of the ink.

3. The ink of claim 1, wherein said ink is printed on a textile substrate.

4. The ink of claim 3, wherein said pigment is a white pigment.

5. The ink of claim 3, wherein said textile substrate contains a polyvalent cation.

6. The ink of claim 1, wherein said ink is printed on a paper substrate.

7. The ink of claim 6, wherein said pigment is a cyan pigment.

8. The ink of claim 1, wherein said dispersant is a polyurethane.

9. The ink of claim 1, wherein said dispersant is an acrylic polymer.

10. The ink of claim 1, wherein $R^2$ is $C_1$-$C_{20}$ alkyl.

11. The ink of claim 10, wherein $W^1$ is $OR^3$.

12. The ink of claim 11, wherein each $R^3$ is H.

13. The ink of claim 11, wherein each $R^3$ is $C_3$-$C_{20}$ substituted branched alkyl.

14. The ink of claim 13, wherein each $R^3$ is —C(O)CH(CH$_3$)$_2$.

15. The ink of claim 10, wherein $R^2$ is $C_3$-$C_{20}$ branched alkyl.

16. The ink of claim 15, wherein $R^2$ is —CH(CH$_3$)$_2$.

17. The ink of claim 16, wherein $W^1$ and is $OR^3$.

18. The ink of claim 17, wherein each $R^3$ is H.

19. The ink of claim 17, wherein each $R^3$ is —C(O)CH(CH$_3$)$_2$.

* * * * *